US010236111B2

(12) United States Patent
Sundaram

(10) Patent No.: US 10,236,111 B2
(45) Date of Patent: Mar. 19, 2019

(54) LOW-PROFILE TRANSFORMER AND METHOD OF MAKING SAME

(71) Applicant: Intel Corporation, Santa Clara, CA (US)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/486,176

(22) Filed: Apr. 12, 2017

(65) Prior Publication Data

US 2018/0301271 A1    Oct. 18, 2018

(51) Int. Cl.
*H01F 5/00*    (2006.01)
*H01F 17/04*    (2006.01)
*H01F 27/28*    (2006.01)
*H01F 27/24*    (2006.01)
*H01F 41/098*    (2016.01)
*H01F 41/02*    (2006.01)
*H05K 5/00*    (2006.01)
*G06F 1/16*    (2006.01)

(52) U.S. Cl.
CPC ........... *H01F 27/28* (2013.01); *G06F 1/1616* (2013.01); *H01F 27/24* (2013.01); *H01F 41/0206* (2013.01); *H01F 41/098* (2016.01); *H05K 5/0017* (2013.01)

(58) Field of Classification Search
USPC ................... 336/221, 188, 211, 83, 200, 233
See application file for complete search history.

(56) References Cited

U.S. PATENT DOCUMENTS

| | | | | |
|---|---|---|---|---|
| 3,659,240 A | * | 4/1972 | Learned | H01F 19/08 336/200 |
| 8,786,393 B1 | * | 7/2014 | Chen | H01F 19/08 336/173 |
| 9,330,834 B2 | * | 5/2016 | Morimoto | H01F 3/06 |
| 2015/0348687 A1 | * | 12/2015 | Chen | H01F 27/2804 363/16 |
| 2016/0247623 A1 | * | 8/2016 | Marusawa | H01F 27/255 |

* cited by examiner

*Primary Examiner* — Elvin G Enad
*Assistant Examiner* — Kazi Hossain
(74) *Attorney, Agent, or Firm* — Schwabe, Williamson & Wyatt, P.C.

(57) ABSTRACT

Techniques and mechanisms for delivering power with a transformer. In an embodiment, the transformer comprises a dielectric slab structure, a first conductor, a layer of ferromagnetic material disposed around first windings of the first conductor, and a second conductor which forms second windings around the layer of ferromagnetic material. For one of the first windings or one of the second windings, a cross-section of the winding conforms to a rectangle, wherein a width of the cross-section which is more than a height of the cross-section. A ferromagnetic material of the ferrite layer extends between successive ones of the first windings. In another embodiment, a volume fraction of the ferromagnetic material in the ferrite layer is equal to or less than ninety seven percent (97%).

14 Claims, 7 Drawing Sheets

LOW-PROFILE TRANSFORMER AND METHOD OF MAKING SAME

BACKGROUND

1. Technical Field

Embodiments of the present invention generally relate to power delivery and more particularly, but not exclusively, to a transformer device which supports a high frequency alternating current output.

2. Background Art

The demand for microprocessors and other integrated circuit (IC) devices to provide ever higher levels of performance and functionality has led to these devices having circuit densities beyond 100 million transistors per die. This number may soon exceed one billion transistors on a single die. The operation of ICs typically relies on power converters to facilitate conversion from one type of alternating current (AC) signal or direct current (DC) signal to another type of AC signal or DC signal. Such converters are commonly used in various desktops, servers, and home electronics, as well as in mobile computer systems such as laptops, mobile phones, personal digital assistants and gaming systems.

Conventional power converters, for example, use switching frequencies in a range of 100 Kilohertz (KHz) to 125 KHz, while some high-end units can operate in a range of 1 Megahertz (MHz) to 2 MHz. These rates are expected to be inadequate for use with new transistor technologies in various platforms. For example, high-electron-mobility transistor (HEMT) devices are one example of a type of technology that uses relatively high-frequency operation, as compared to that of older transistor architectures.

As market pressures continue to push for smaller (e.g., thinner) platforms which support faster operational speeds while remaining price competitive, there is an increasing premium placed on incremental improvements to power delivery mechanisms that support such platforms.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments described herein variously include techniques or mechanisms for providing functionality of a transformer device. In an embodiment, a transformer provides a low-profile form factor for high energy density power conversion—e.g., where the transformer supports conversion to or from a high frequency alternating current (AC) signal.

Such a transformer may include a body of dielectric material (referred to herein as a "dielectric slab structure," or for brevity, simply "slab structure"), a first conductor extending around the dielectric slab structure, a layer of ferromagnetic material disposed around windings of the first conductor, and a second conductor extending around the layer of ferromagnetic material. Operation of the transformer may include conduction of a first signal and a second signal with the first conductor and with the second conductor, respectively. In some embodiments, high frequency switching with the transformer (e.g., where an output signal is in a range of 10 MHz to 60 MHz) is enabled due at least in part to physical properties of the ferrite material and/or physical properties of the conductive windings.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers (e.g., netbook computers, notebook computers, etc.), internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies may be employed in any of a variety of electronic devices including a transformer which has features described herein.

Figure 1:
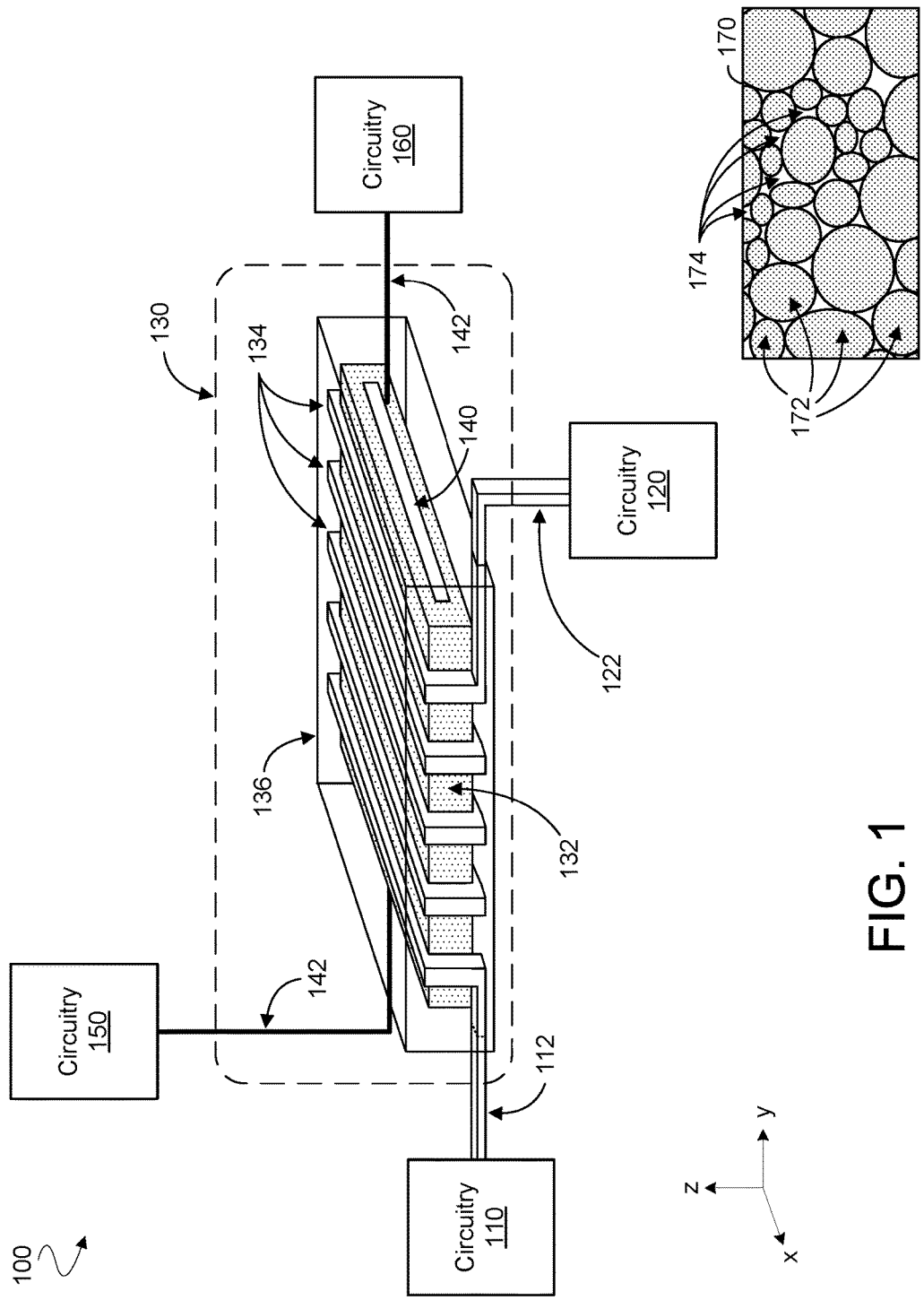
FIG. 1 is a hybrid perspective view and functional block diagram illustrating elements of a system to deliver power according to an embodiment.

FIG. 1 shows features of a system 100 to deliver power to circuitry according to an embodiment. System 100 is one example of an embodiment which enables power conversion with a transformer that supports high energy density in a space-efficient form factor. In the illustrative embodiment shown, system 100 includes a transformer 130 and circuitry (such as the illustrative circuitry 110, 120, 150, 160 shown) coupled thereto, where such circuitry is to variously deliver power and/or receive power via transformer 130. For example, circuitry 150, 160 may be coupled to one another via a first conductor 142 of transformer 130, where circuitry 110, 120 are coupled to one another via a second conductor of transformer 130 (e.g., the second conductor including conductive portions 112, 122 and windings 134 therebetween). Circuitry 150, 160 may be different respective portions of a first circuit which is to conduct a first signal via a first conductor 142. Similarly, circuitry 110, 120 may be different respective portions of a second circuit which is to conduct a second signal via the second conductor. In such an embodiment, one of the first signal and the second signal may provide power based on the other of the first signal and the second signal.

Transformer 130 may include a dielectric slab structure 140, where the first conductor 142 forms first windings (not shown) around slab structure 140. Slab structure 140 may include any of a variety of dielectric materials including, but not limited to, FR-4, mica, ceramic and the like. In some embodiments, slab structure 140 includes a high dielectric perovskite such as barium titanate ($BaTiO_3$) or any of various barium-strontium-titanate materials.

Transformer 130 may further comprise a structure—such as the illustrative ferrite layer 132 shown—including a ferromagnetic material which extends around both the dielectric slab structure 140 and windings formed by the first conductor 142. Examples of such ferromagnetic materials include, but are not limited to, nickel zinc, nickel zinc ferrite, a manganese zinc ferrite, a carbonyl iron, any of various powdered iron ferrites and/or the like. In such an embodiment, windings 134 formed by the second conductor may extend around the first windings and around a portion of ferrite layer 132. A layer of insulator material (not shown) may be disposed to provide insulation between ferrite layer 132 and windings 134, in some embodiments. The first conductor 142 and/or the second conductor (including portions 112, 122 and windings 134) may, for example, comprise any of a variety of metals, alloys etc. including, but not limited to, copper (Cu), aluminum (Al), silver (Ag), silver plated copper, gold (Au), electroless nickel immersion gold (ENIG) copper, plated copper/nickel or the like.

Transformer 130 may be configured to provide a low-profile (z-height) form factor which allows for high energy densities and high switching rates—e.g., as compared to existing transformer architectures. In one illustrative embodiment, a length (x-axis dimension) of transformer 130 is between 12 millimeters (mm) and 15 mm—e.g., where a width (y-axis dimension) of transformer 130 is between 8 mm and 15 mm and/or a thickness (z-axis dimension) of transformer 130 is between 1 mm and 5 mm. However, such dimensions of transformer 130 are merely illustrative, and may vary in different embodiments based on implementation-specific details. Fabrication of ferrite layer 132, dielectric slab structure 140, first conductor 142, the second conductor and/or other structures of transformer 130 may include one or more operations adapted, for example, from conventional additive processes and/or subtractive processes for fabricating electronic components. The particular details of such conventional techniques, which are not limiting on some embodiments, are not detailed herein to avoid obscuring features of such embodiments.

Although some embodiments are not limited in this regard, structures of transformer 130 may variously extend through, or otherwise be disposed in, a package 136 thereof. Package 136—which, for example, includes an epoxy mold compound and/or any of a variety of other known packaging materials—is shown as being transparent in FIG. 1 merely to illustrate various structures disposed therein.

The configuration of one or more conductive winding structures of transformer 130 may facilitate improved signal frequency characteristics of system 100. For example, a cross-sectional profile of one or more conductive windings may have a shape (e.g., a rectangle) other than any circle. Windings which are relatively wide and low profile may aid in a magnetic coupling between the first conductor 142 and the second conductor via ferrite layer 132. In some embodiments, successive windings of a conductor may be separated from one another—e.g., to provide improved conductance by mitigating flux effects between such windings and/or by allowing ferromagnetic material to extend between the windings.

Alternatively or in addition, physical characteristics of one or more ferrite structures may facilitate improved switching characteristics of system 100. For example, as illustrated by the cross-sectional detail view in inset 170 of FIG. 1, ferrite layer 132 may include particles, granules and/or other such clusters of ferromagnetic material that variously extend around gap regions in ferrite layer 132. Such clusters (referred to herein as "ferrite node structures") may be variously melted or otherwise bonded to one another—e.g., by a sintering process. For example, these nodes may include distinct ferrite particles which variously adjoin one another and/or may include ferrite structures which are melted together at their respective surfaces. An interface between one ferrite node structure and an adjoining ferrite node structure may be indicated, for example, by a local minimum in the cross-sectional area of any ferromagnetic material between the node structures.

In the illustrative embodiment shown by inset 170, ferrite layer 132 comprises ferrite node structures 172 which variously adjoin and extend around gap regions 174. Gap regions 174 may variously have disposed therein air and/or a binding material used to facilitate a sintering or other process to bond ferrite particles. Such a binding material may include paraffin, for example, although some embodiments are not limited in this regard. The respective lengths (e.g., diameters) of ferrite node structures 172 may, for example, be in a range of 30 nanometers (nm) to 30 microns—e.g., depending on implementation specific details.

Ferrite layer 132 may have at least some minimum volume fraction which is attributable to gap regions such as the illustrative gap regions 174 shown. In providing such a minimum volume fraction of gap regions (and a corresponding maximum volume fraction of all ferromagnetic material of the layer), some embodiments mitigate the possibility of transformer 130 being saturated during its operation. By way of illustration and not limitation, a volume fraction of ferromagnetic material in ferrite layer 132 may be equal to or less than 97%—e.g., wherein the volume fraction of gap regions 174 in ferrite layer 132 is in a range of 3% to 25% (and, in some embodiments, in a range of 5% to 15%). It is understood that the total volume of ferrite layer 132 does not include the volume of other structures which are surrounded by ferrite layer 132—e.g., where such structures include portions of dielectric slab structure 140 and conductor 142.

The volume fraction of gap regions 174 may be due at least in part to ferrite node structures 172 comprising node structures of different sizes—e.g., wherein the respective sizes (for example, lengths) of ferrite node structures 172 have a non-Gaussian distribution. By way of illustration and not limitation, ferrite node structures 172 may consist of a combination of first ferrite node structures having a first Gaussian size distribution and second ferrite node structures having a second Gaussian size distribution. In such an embodiment, a difference—e.g., an absolute difference—between a first average of the first Gaussian size distribution and a second average of the second Gaussian size distribution may be at least 10% (in some embodiments, at least 20%) of the second average. Any of a variety of other combinations of two or more different sizes of ferrite node structures may be implemented, in various embodiments.

In some embodiments, a volume fraction of ferromagnetic material varies across ferrite layer 132 to provide ferromagnetic characteristics for improved switching frequencies. For example, on a given side of dielectric slab structure 140, the volume fraction of ferromagnetic material in ferrite layer 132 may vary by at least 10% (e.g., by at least 20%) between a bottom ten percent sublayer portion which is closest to that side of dielectric slab structure 140 and a top ten percent sublayer portion which is farthest from that side of dielectric slab structure 140.

Figure 2:
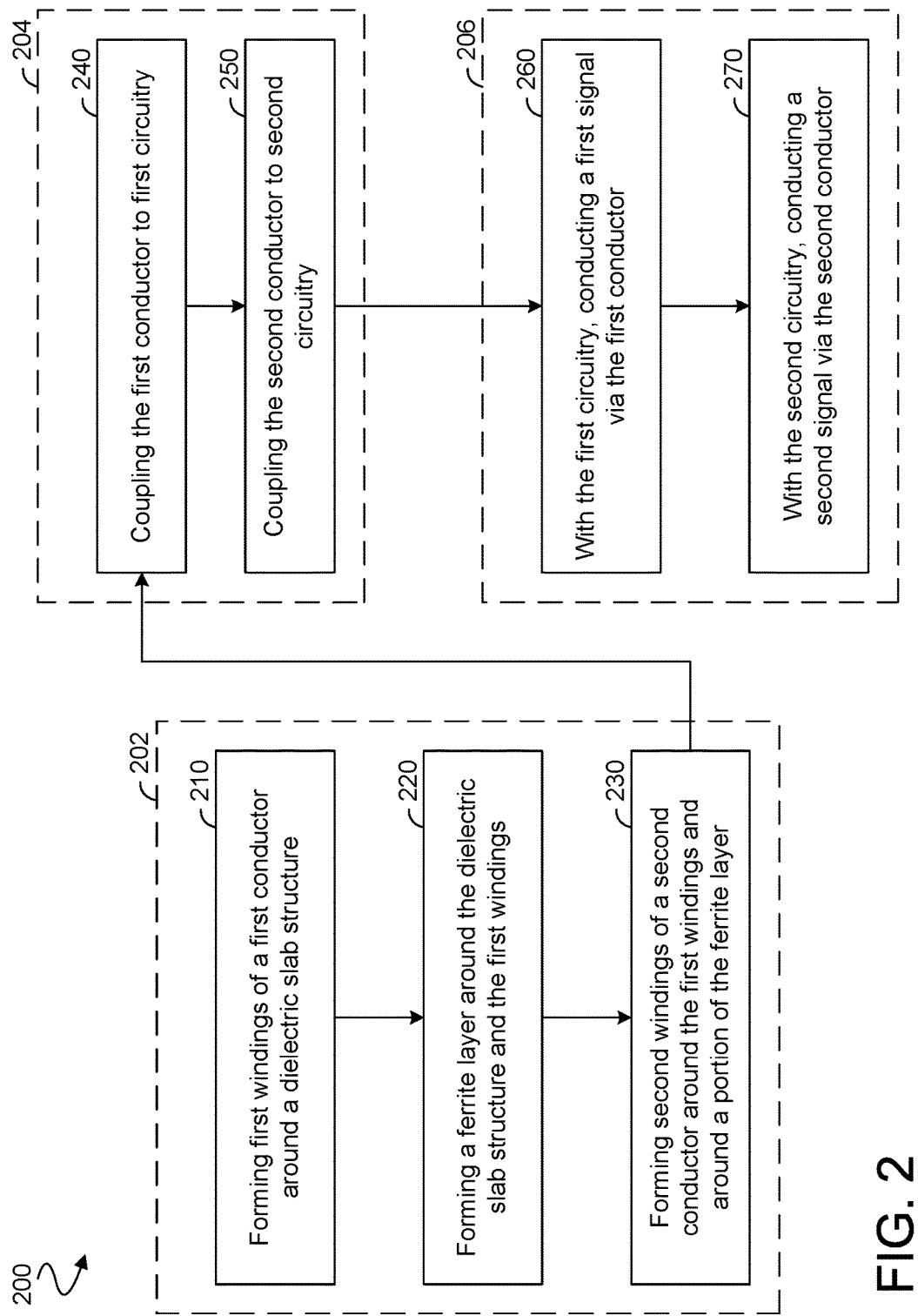
FIG. 2 is a flow diagram illustrating elements of a method for providing functionality of a transformer device according to an embodiment.

FIG. 2 illustrates elements a method 200 to provide functionality of a transformer according to an embodiment. Method 200 may provide some or all of the functionality of system 100, for example. FIGS. 3A-3E shows respective stages 300a-300e of processing to fabricate a transformer which, for example, has features of transformer 130. Method 200 is described herein with respect to processing to fabricate structures such as those shown in stages 300a-300e.

However, such description may be extended to apply to processing which fabricates any of a variety of additional or alternative transformer structures variously detailed herein.

Figure 3B:
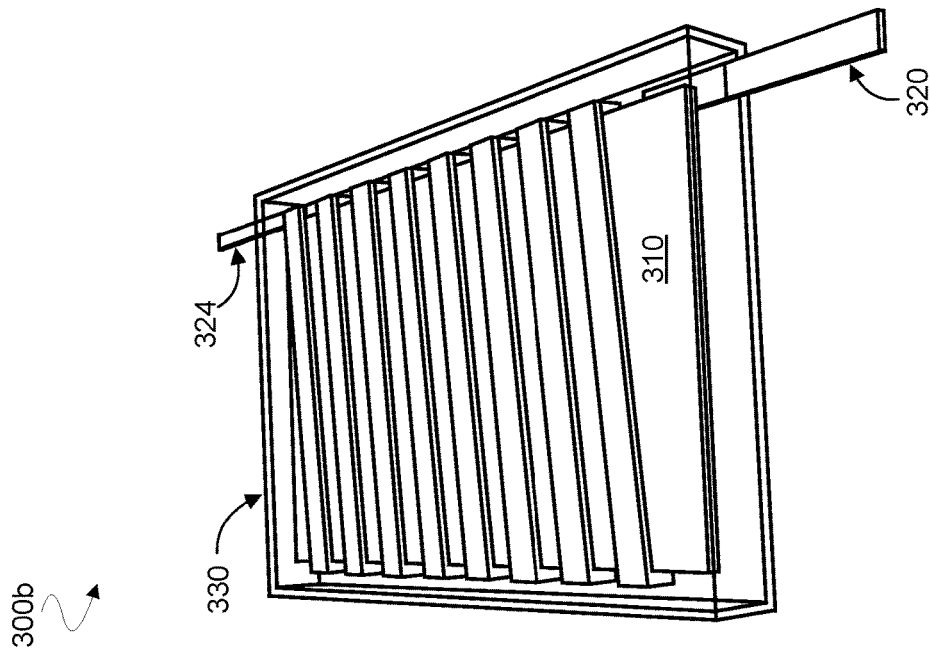
FIGS. 3A-3E are perspective views each of respective structures during a corresponding stage of processing to fabricate a transformer according to an embodiment.
Figure 3A:
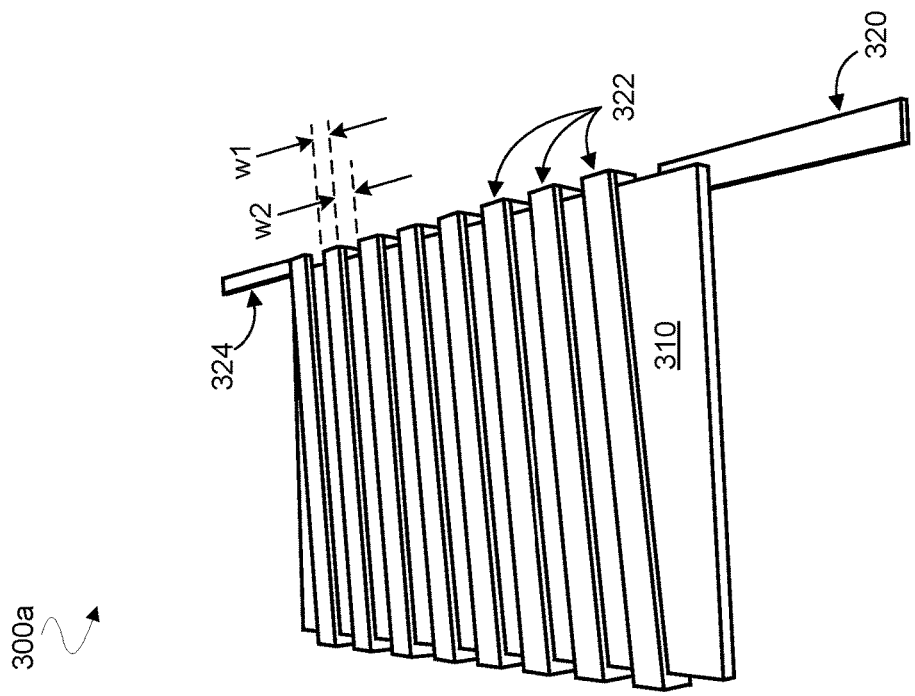

Method 200 may include operations 202 to fabricate a transformer such as that resulting from processing illustrated by stages 300a-300e. In an embodiment, operations 202 include, at 210, forming first windings of a first conductor around a slab structure comprising a first dielectric. Referring to FIG. 3A, a first conductor may, at a processing stage 300a, be wound, plated or otherwise formed around a slab structure 310—e.g., wherein the first conductor includes the illustrative conductor portions 320, 324 and windings 322 shown.

A thickness (z-axis dimension) of slab structure 310 may, for example, be not more than 1.5 mm and, in some embodiments, not more than 1.0 mm. Alternatively or in addition, a width of slab structure 310 and a length of slab structure 310 may each be at least twice—e.g., at least three times and, in some embodiments, at least five times—the thickness of slab structure 310. However, such dimensions of slab structure 310 are merely illustrative, and may not be limiting on some embodiments. An individual one of windings 322 may have a cross-section that is orthogonal to a direction along which the winding is to conduct current. A height of such a cross-section (perpendicular to the adjoining surface of slab structure 310) may, for example, be in a range of 0.05 mm to 0.4 mm—e.g., wherein a width of the cross-section (in parallel with the adjoining surface of slab structure 310) is in a range of 0.3 mm to 1.0 mm. In some embodiments, the width of such a cross-section may be at least three times (e.g., at least five times) its thickness. However, such dimensions of windings 322 are merely illustrative, and may not be limiting on some embodiments.

In an embodiment, operations 202 further include, at 220, forming a ferrite layer around the slab structure and the first windings. For example, as shown in FIG. 3B, a ferrite layer 330 may be sintered, injection molded, stamped or otherwise formed around windings 322 and around at least a portion of slab structure 310. In one embodiment, successive ones of windings 322 are offset from one another on one or more sides of slab structure 310—e.g., wherein ferromagnetic material of ferrite layer 330 extends between such windings. Deposition of such ferromagnetic material between windings 322 may facilitate improved coupling between conductors via ferrite layer 330. Ferrite layer 330 is shown as being transparent merely to illustrate structures disposed therein.

An overall thickness (z-axis dimension) of ferrite layer 330 may, for example, be equal to or less than 5 mm and, in some embodiments, equal to or less than 4 mm. Alternatively or in addition, a width of ferrite layer 330 and a length of ferrite layer 330 may each be at least twice—e.g., at least three times and, in some embodiments, at least five times—the thickness of ferrite layer 330. However, such dimensions of ferrite layer 330 are merely illustrative, and may not be limiting on some embodiments. Although some embodiments are not limited in this regard, an insulation layer (such as the illustrative insulator 332 shown at stage 300c of FIG. 3C) may be subsequently deposited around ferrite layer 330. Insulator 332 may include polytetrafluoroethylene (PTFE), Teflon®, mica, high-density polyethylene (HDPE) or any of a variety of other insulation materials.

Operations 202 may further comprise, at 230, forming second windings of a second conductor around the first windings and around at least a portion of the ferrite layer. For example, referring now to FIG. 3D, a second conductor may be formed (at stage 300d) around slab structure 310, windings 322, at least a portion of ferrite layer 330 and, in some embodiments, insulator 332. As shown at processing stage 300d, the second conductor may include conductor portions 340, 344 and windings 342 therebetween, wherein ferrite layer 330 (and insulator 332, in some embodiments) is disposed between windings 322 and windings 342.

An individual one of windings 342 may similarly have a cross-section that is orthogonal to a direction along which the winding is to conduct a current. A thickness of such a cross-section (i.e., a height dimension measured perpendicular to the adjoining surface of insulator 332) may, for example, be in a range of 0.05 mm to 0.8 mm—e.g., wherein a width of the cross-section (measured in parallel with the adjoining surface of slab structure 310) is in a range of 0.3 mm to 1.5 mm. The width of such a cross-section may be at least three times (e.g., at least five times) its thickness. In some embodiments, an average cross-sectional area of one of windings 342 (the cross-section orthogonal to a direction in which current is to flow through the winding) is at least two times—and in some embodiments, at least four times—a corresponding average cross-sectional area of one of windings 322. However, such dimensions of windings 342 are merely illustrative, and may vary according to implementation-specific details.

In some embodiments, operations 202 further comprise packaging structures of the transformer. For example, as illustrated by the stage 300e shown in FIG. 3E, a package 350 may be injection molded or otherwise formed around slab structure 310, ferrite layer 330, windings 322 and windings 342. FIG. 3E also shows a cross-sectional view 302 of the packaged transformer structures at stage 300e, where view 302 shows structures extending in the plane 304 shown. The configuration of one or more conductive winding structures may facilitate improved switching characteristics of the transformer. For example, a portion of a winding (or "winding portion") of a conductor—e.g., a given one of the first conductor and the second conductor—may have a cross-sectional profile which conforms to a shape (e.g., a rectangle) other than any circle.

As used herein, "height-to-width ratio" (or "height/width ratio") refers to a ratio of a maximum height of the winding portion to a width of that same winding portion. In this particular context, "height" refers to a maximum dimension (e.g., along the z-axis in view 302) of a winding portion, as measured from, and in a direction orthogonal to, a side of the slab on which the winding portion is disposed. Also in this context, "width" refers to a dimension of the winding portion along a line of direction which is orthogonal both to the height and to a direction in which current is to flow within the winding portion. For example, as variously shown in FIG. 3A, 3D, some or all of windings 322 may have a width w1, where some or all of windings 342 may have a width w3.

In one illustrative embodiment, one or more winding portions of a conductor (e.g., one or more of windings 322 and/or one or more of windings 342) have a height/width ratio which is equal to or less than 0.35 (e.g., wherein the height/width ratio is equal to or less than 0.20). For example, windings 322 and windings 342 may each have a respective height/width ratio which is equal to or less than 0.35. In some embodiments, windings formed by different conductors have different respective height/width ratios. By way of illustration and not limitation, a difference between a first height/width ratio of windings 322 and a second height/width ratio of windings 342 may be at least 10% of the second height/width ratio (e.g., at least 20% of the second height/width ratio). Alternatively or in addition, windings 322 and windings 342 may have different respective widths—e.g., wherein a difference between a first cross-sectional width of one of windings 322 and a second cross-sectional width of windings 342 is at least 20% (e.g., at least 30%) of the second cross-sectional width.

In some embodiments, frequency characteristics of the transformer are additionally or alternatively improved by a separation of windings 322 from each other and/or by a separation of windings 342 from each other. As used herein, 'winding separation distance' (or simply 'winding separation') refers to an offset, from a given side of a slab structure, between a first winding portion which extends across that given side and a next subsequent winding portion which extends across that given side. The separation distance may be measured along a line of direction which is parallel to the width of one of the winding portion (e.g., in a direction which is orthogonal both to the height dimension of the winding portion and to a direction in which current is to flow in the winding portion). A winding separation may mitigate flux interference between successive windings.

Figure 3D:
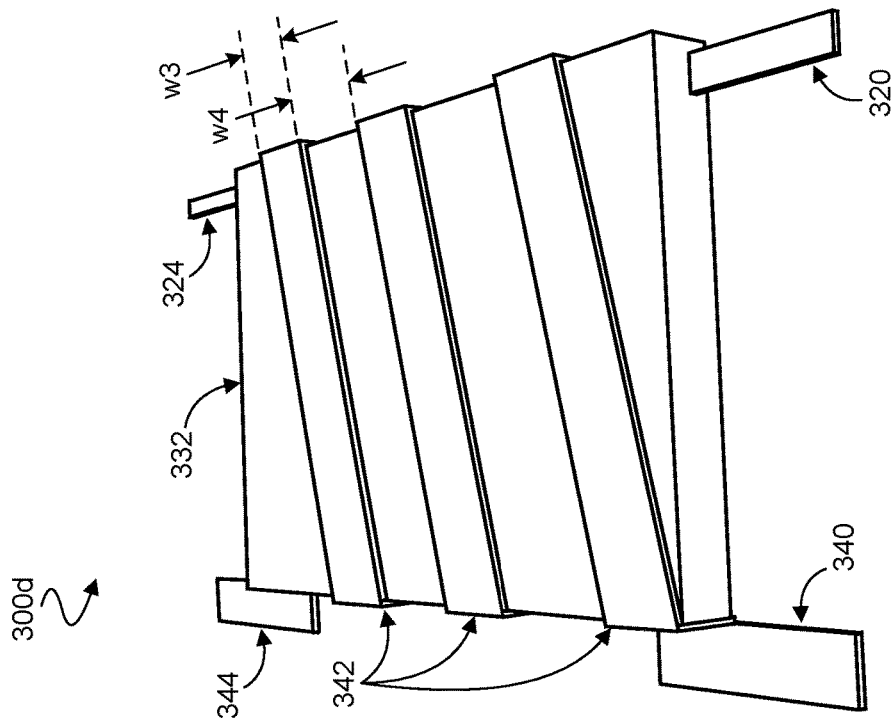
Figure 3C:
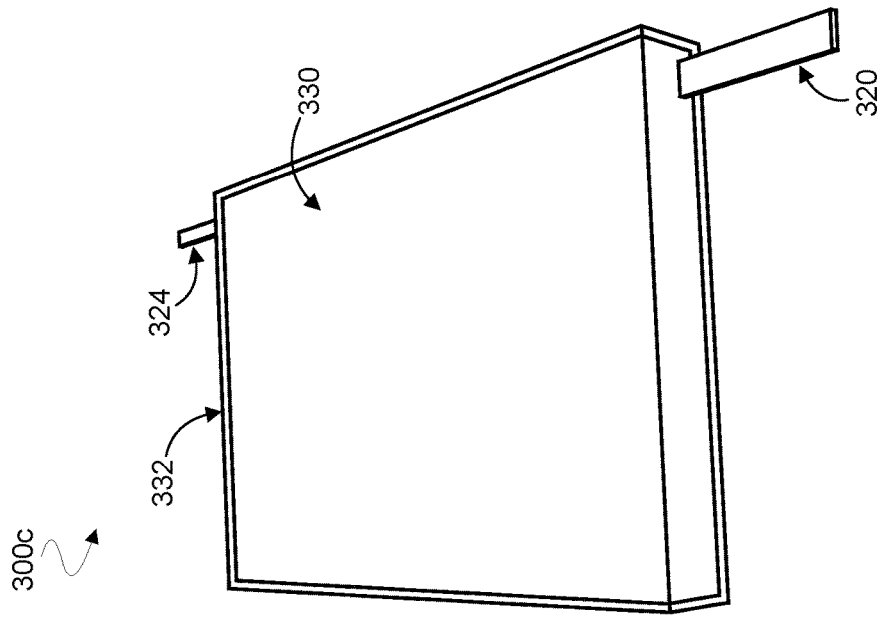
Figure 3E:
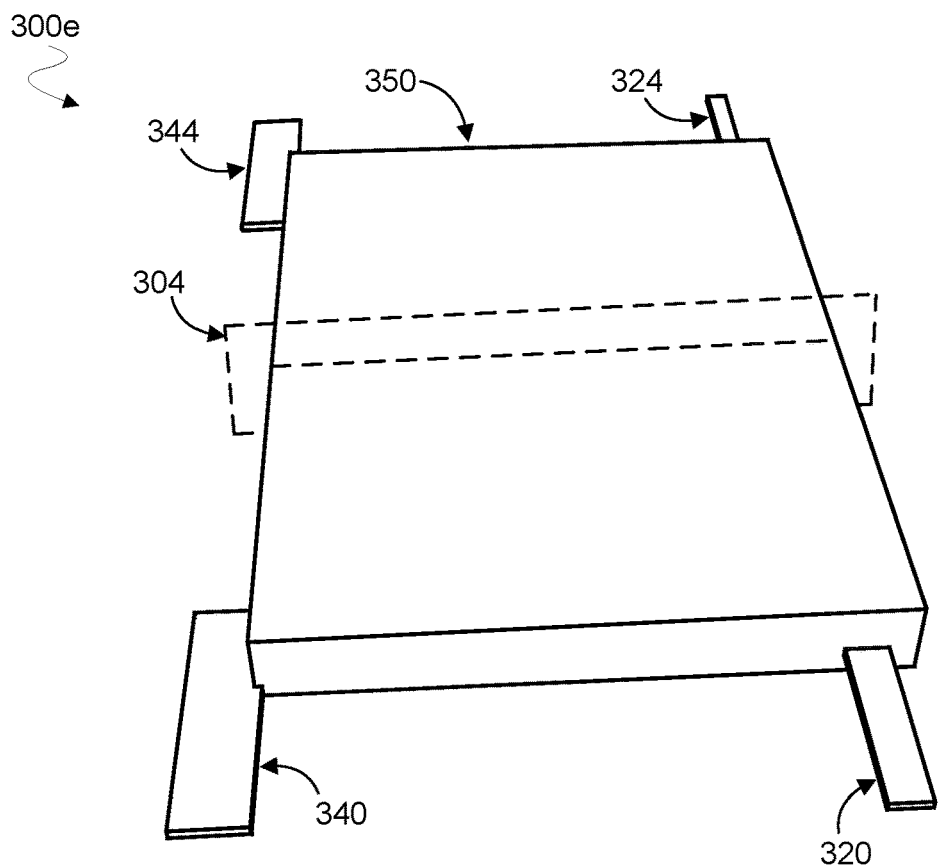
Figure 3E:
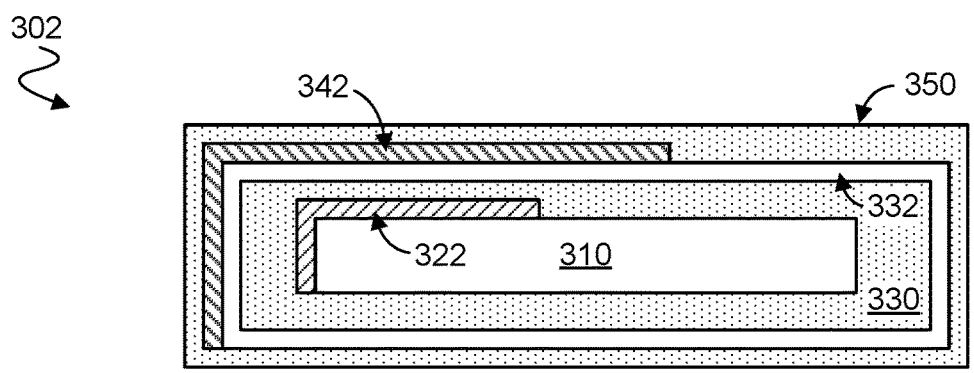
Figure 3E:
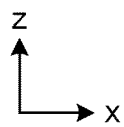

For example, as variously shown in FIG. 3A, 3D, successive ones of windings 322 may be offset from one another by a winding separation distance w2—e.g., wherein successive ones of windings 342 are offset from one another by winding separation distance w4. As used herein, 'separation-to-width ratio' (or "separation/width ratio") refers to a ratio of a winding separation between successive winding portions to an average width of at least one such winding portion. For windings of a given conductor (e.g., for windings 322 or windings 342), a separation/width ratio of the windings may be at least 10% (e.g., at least 20% and, in some embodiments, at least 40%). In one example embodiment, windings 322 and windings 342 each have a respective separation/width ratio which is at least 20%. Windings 322 and windings 342 may, for example, have different respective separation/width ratios—e.g., wherein a difference between a first separation/width ratio w2/w1 of windings 322 and a second separation/width ratio w4/w3 of windings 342 is at least 10% of the second separation/width ratio w4/w3 (e.g., at least 20% of w4/w3).

Alternatively or in addition, method 200 may include operations 204 to couple a transformer (such as that formed by operations 202) to other circuitry which, for example, is to deliver power to and/or receive power from the transformer. For example, operations 204 may include, at 240, coupling the first conductor to first circuitry—e.g., where the first circuitry is to provide power to (or alternatively, receive power from) the transistor via the first conductor. Operations 204 may additionally or alternatively include, at 250, coupling the second conductor to second circuitry which, for example, is to receive power from (or alternatively, provide power to) the transistor via the second conductor.

In some embodiments, method 200 additionally or alternatively includes operations 206 to deliver power using a transformer such as one fabricated by operations 202. For example, operations 206 may include, at 260, conducting a first signal via the first conductor with the first circuitry. Operations 206 may further include, at 270, conducting a second signal via the second conductor with the second circuitry—e.g., wherein a power delivered by one of the first signal and the second signal is based on the other of the first signal and the second signal.

Figure 4:
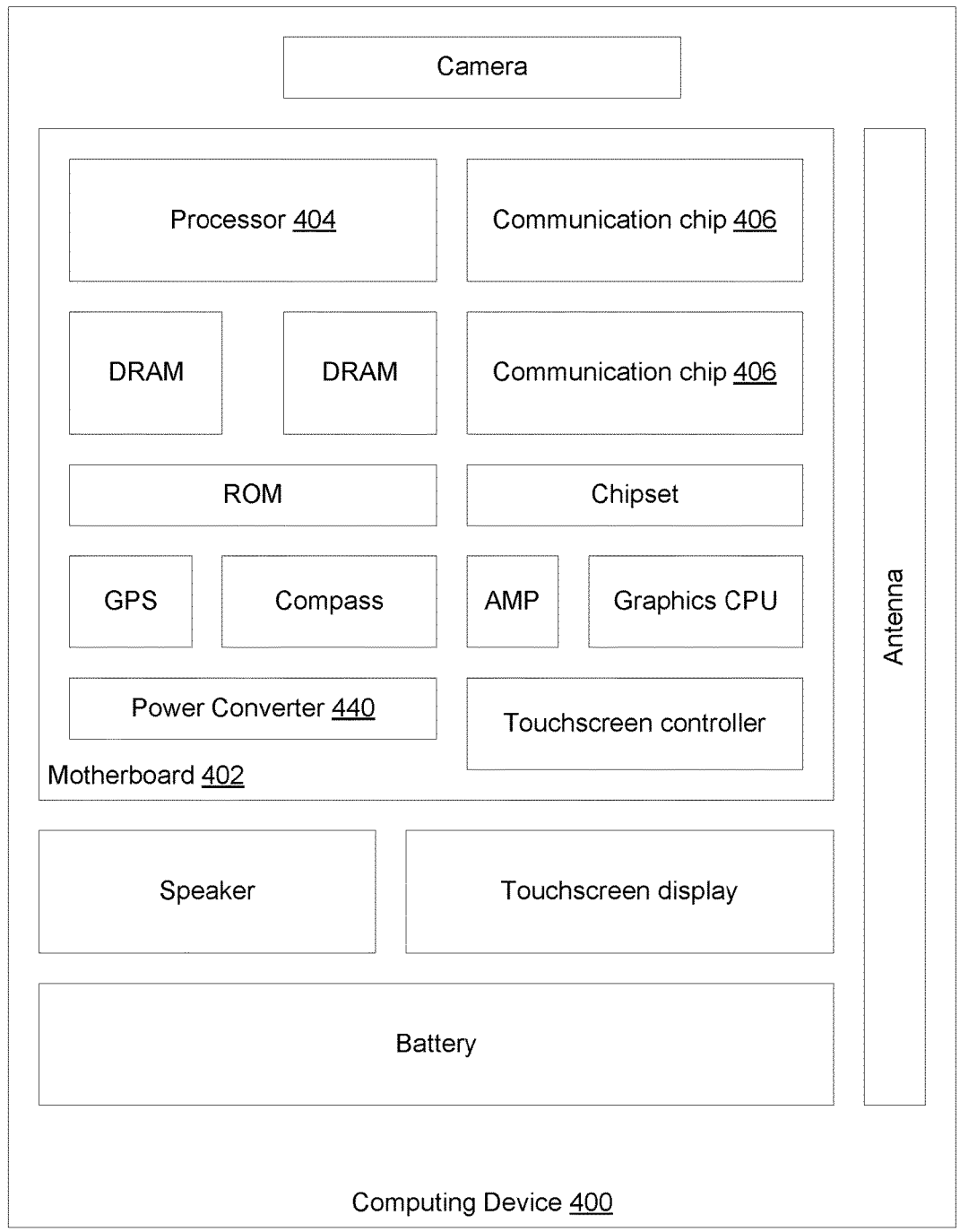
FIG. 4 is a functional block diagram illustrating elements of a computer device according to an embodiment.

FIG. 4 illustrates a computing device 400 in accordance with one embodiment. The computing device 400 houses a board 402. The board 402 may include a number of components, including but not limited to a processor 404 and at least one communication chip 406. The processor 404 is physically and electrically coupled to the board 402. In some implementations the at least one communication chip 406 is also physically and electrically coupled to the board 402. In further implementations, the communication chip 406 is part of the processor 404.

Depending on its applications, computing device 400 may include other components that may or may not be physically and electrically coupled to the board 402. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 406 enables wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

The processor 404 of the computing device 400 includes an integrated circuit die packaged within the processor 404. The term "processor" may refer to any device or portion of a device that processes electronic data from registers and/or memory to transform that electronic data into other electronic data that may be stored in registers and/or memory. The communication chip 406 also includes an integrated circuit die packaged within the communication chip 406. In an embodiment, the motherboard 402 includes or couples to a power converter 440 (e.g., comprising a transformer as described herein) to provide power to processor 404, communication chip 406 and/or other components of computing device 400.

In various implementations, the computing device 400 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 400 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 5:
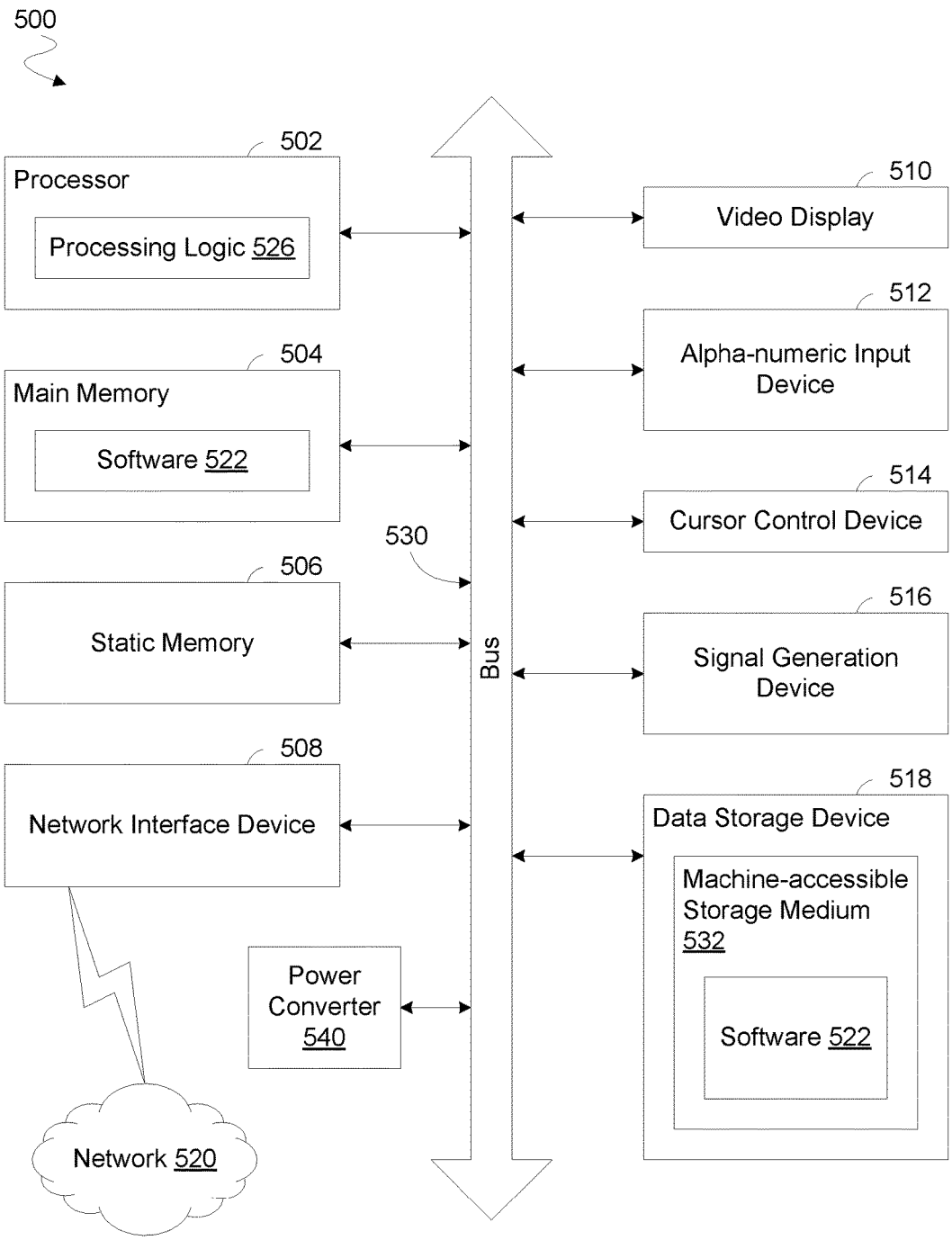
FIG. 5 is a functional block diagram illustrating elements of a computer system according to an embodiment.

FIG. 5 illustrates a diagrammatic representation of a machine in the exemplary form of a computer system 500 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations described herein.

The computer system 500 may further include a network interface device 508. The computer system 500 also may include a video display unit 510 (e.g., a liquid crystal display (LCD), a light emitting diode display (LED), or a cathode ray tube (CRT)), an alphanumeric input device 512 (e.g., a keyboard), a cursor control device 514 (e.g., a mouse), and a signal generation device 516 (e.g., a speaker). In an embodiment, a power converter 540, comprising a transformer as described herein, is coupled to provide power to processor 502, main memory 504 and/or other components of computer system 500.

The secondary memory 518 may include a machine-accessible storage medium (or more specifically a computer-readable storage medium) 532 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface device 508.

While the machine-accessible storage medium 532 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

In one implementation, a transformer device comprises a dielectric slab structure, a first conductor to conduct a first signal, wherein the first conductor forms first windings around the dielectric slab structure, wherein a first cross-section of one of the first windings conforms to a first shape other than any circle, wherein the first cross-section is orthogonal to a direction in which the first signal is to flow. The transformer device further comprises a ferrite layer disposed around the dielectric slab structure and the first windings, wherein a ferromagnetic material of the ferrite layer extends between successive ones of the first windings, wherein a volume fraction of the ferromagnetic material in the ferrite layer is equal to or less than ninety seven percent (97%). The transformer device further comprises a second conductor to conduct a second signal, wherein the second conductor forms second windings which extend around the first windings and around a portion of the ferrite layer, wherein a second cross-section of one of the second windings conforms to a second shape other than any circle, wherein the second cross-section is orthogonal to a direction in which the second signal is to flow.

In one embodiment, a difference between a first width of the first cross-section and a second width of second cross-section is at least twenty percent of the second width. In another embodiment, for one of the first cross-section and the second cross-section, a height-to-width ratio of the cross-section is equal to or less than 0.35. In another embodiment, a difference between a first height-to-width ratio of the first cross-section and a second height-to-width ratio of the second cross-section is at least ten percent of the second height-to-width ratio. In another embodiment, for one of the first windings and the second windings, a separation-to-width ratio of the windings is at least 10%. In another embodiment, the first windings and the second windings each have a respective separation-to-width ratio which is at least 20%. In another embodiment, a difference between a first separation-to-width ratio of the first winding and a second separation-to-width ratio of the second windings is at least ten percent of the second separation-to-width ratio. In another embodiment, a thickness of the ferrite layer is equal to or less than 5 mm.

In another implementation, a method comprises fabricating a transformer, including forming first windings of a first conductor around a dielectric slab structure, wherein a first cross-section of one of the first windings conforms to a first shape other than any circle, wherein the first cross-section is orthogonal to a direction in which a first signal is to flow in the one of the first windings, and forming a ferrite layer around the first slab structure and the first windings, wherein a ferromagnetic material of the ferrite layer extends between successive ones of the first windings, wherein a volume fraction of the ferromagnetic material in the ferrite layer is equal to or less than ninety seven percent (97%). Fabricating the transformer further comprises forming second windings of a second conductor around the first windings and around a portion of the ferrite layer, wherein a second cross-section of one of the second windings conforms to a second shape other than any circle, the second cross-section orthogonal to a direction in which a second signal is to flow in the one of the second windings.

In one embodiment, a difference between a first width of the first cross-section and a second width of second cross-section is at least twenty percent of the second width. In another embodiment, for one of the first cross-section and the second cross-section, a height-to-width ratio of the cross-section is equal to or less than 0.35. In another embodiment, a difference between a first height-to-width ratio of the first cross-section and a second height-to-width ratio of the second cross-section is at least ten percent of the second height-to-width ratio. In another embodiment, for one of the first windings and the second windings, a separation-to-width ratio of the windings is at least 10%. In another embodiment, the first windings and the second windings each have a respective separation-to-width ratio which is at least 20%. In another embodiment, a difference between a first separation-to-width ratio of the first winding and a second separation-to-width ratio of the second windings is at least ten percent of the second separation-to-width ratio. In another embodiment, a thickness of the ferrite layer is equal to or less than 5 mm. In another embodiment, the method further comprises coupling the first conductor to first circuitry, and coupling the second conductor to second circuitry. In another embodiment, the method further comprises, with the first circuitry, conducting a first signal via the first conductor, and with the second circuitry, conducting a second signal via the second conductor, wherein a power delivered by one of the first signal and the second signal is based on the other of the first signal and the second signal.

In another implementation, a system comprises a transformer device comprising a dielectric slab structure, a first conductor which forms first windings around the dielectric slab structure, wherein a first cross-section of one of the first windings conforms to a first shape other than any circle, wherein the first cross-section is orthogonal to a direction in which the first signal is to flow. The transformer device further comprises a ferrite layer disposed around the dielectric slab structure and the first windings, wherein a ferromagnetic material of the ferrite layer extends between successive ones of the first windings, wherein a volume fraction of the ferromagnetic material in the ferrite layer is equal to or less than ninety seven percent (97%). The transformer device further comprises a second conductor which forms second windings around the first windings and around a portion of the ferrite layer, wherein a second cross-section of one of the second windings conforms to a second shape other than any circle, wherein the second cross-section is orthogonal to a direction in which second signal is to flow. The system further comprises first circuitry coupled to conduct a first signal via the first conductor, second circuitry coupled to conduct a second signal via the second conductor, and a display device coupled to the first circuitry and the second circuitry, the display device to display an image based on the first signal and the second signal.

In one embodiment, a difference between a first width of the first cross-section and a second width of second cross-section is at least twenty percent of the second width. In another embodiment, for one of the first cross-section and the second cross-section, a height-to-width ratio of the cross-section is equal to or less than 0.35. In another embodiment, a difference between a first height-to-width ratio of the first cross-section and a second height-to-width ratio of the second cross-section is at least ten percent of the second height-to-width ratio. In another embodiment, for one of the first windings and the second windings, a separation-to-width ratio of the windings is at least 10%. In another embodiment, the first windings and the second windings each have a respective separation-to-width ratio which is at least 20%. In another embodiment, a difference between a first separation-to-width ratio of the first winding and a second separation-to-width ratio of the second windings is at least ten percent of the second separation-to-width ratio. In another embodiment, a thickness of the ferrite layer is equal to or less than 5 mm.

Techniques and architectures for providing inductance of circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A transformer device comprising:
   a dielectric slab structure;
   a first conductor to conduct a first signal, wherein the first conductor forms first windings around the dielectric slab structure, wherein a first cross-section of one of the first windings conforms to a first shape other than any circle, wherein the first cross-section is orthogonal to a direction in which the first signal is to flow;
   a ferrite layer disposed surrounding the dielectric slab structure and the first windings, wherein a ferromagnetic material of the ferrite layer extends between successive ones of the first windings, wherein a volume fraction of the ferromagnetic material in the ferrite layer is equal to or less than ninety seven percent (97%); and
   a second conductor to conduct a second signal, wherein the second conductor forms second windings which extend surrounding the first windings and surrounding a portion of the ferrite layer, wherein a second cross-section of one of the second windings conforms to a second shape other than any circle, wherein the second cross-section is orthogonal to a direction in which the second signal is to flow.

2. The transformer device of claim 1, wherein a difference between a first width of the first cross-section and a second width of second cross-section is at least twenty percent of the second width.

3. The transformer device of claim 1, wherein, for one of the first cross-section and the second cross-section, a height-to-width ratio of the cross-section is equal to or less than 0.35.

4. The transformer device of claim 1, wherein a difference between a first height-to-width ratio of the first cross-section and a second height-to-width ratio of the second cross-section is at least ten percent of the second height-to-width ratio.

5. The transformer device of claim 1, wherein, for one of the first windings and the second windings, a separation-to-width ratio of the windings is at least 10%.

6. The transformer device of claim 1, wherein the first windings and the second windings each have a respective separation-to-width ratio which is at least 20%.

7. The transformer device of claim 1, wherein a difference between a first separation-to-width ratio of the first winding and a second separation-to-width ratio of the second windings is at least ten percent of the second separation-to-width ratio.

8. The transformer device of claim 1, wherein a thickness of the ferrite layer is equal to or less than 5 mm.

9. A system comprising:
   a transformer device comprising:
      a dielectric slab structure;
      a first conductor which forms first windings around the dielectric slab structure, wherein a first cross-section of one of the first windings conforms to a first shape other than any circle, wherein the first cross-section is orthogonal to a direction in which the first signal is to flow;
      a ferrite layer disposed surrounding the dielectric slab structure and the first windings, wherein a ferromagnetic material of the ferrite layer extends between successive ones of the first windings, wherein a volume fraction of the ferromagnetic material in the ferrite layer is equal to or less than ninety seven percent (97%); and
      a second conductor which forms second windings surrounding the first windings and surrounding a portion of the ferrite layer, wherein a second cross-section of one of the second windings conforms to a second shape other than any circle, wherein the second cross-section is orthogonal to a direction in which the second signal is to flow;
   first circuitry coupled to conduct a first signal via the first conductor;
   second circuitry coupled to conduct a second signal via the second conductor; and
   a display device coupled to the first circuitry and the second circuitry, the display device to display an image based on the first signal and the second signal.

10. The system of claim 9, wherein a difference between a first width of the first cross-section and a second width of second cross-section is at least twenty percent of the second width.

11. The system of claim 9, wherein, for one of the first cross-section and the second cross-section, a height-to-width ratio of the cross-section is equal to or less than 0.35.

12. The system of claim 9, wherein a difference between a first height-to-width ratio of the first cross-section and a second height-to-width ratio of the second cross-section is at least ten percent of the second height-to-width ratio.

13. The system of claim 9, wherein, for one of the first windings and the second windings, a separation-to-width ratio of the windings is at least 10%.

14. The system of claim 9, wherein a thickness of the ferrite layer is equal to or less than 5 mm.

\* \* \* \* \*